Aug. 25, 1970  H. L. SETZ  3,525,658
GLASS-PLASTIC LAMINATES HAVING A LAYER OF GLASS
FIBER FILLED POLYCARBONATE
Filed Nov. 21, 1968
HENRY L. SETZ
INVENTOR
BY
ATTORNEYS

United States Patent Office

3,525,658
Patented Aug. 25, 1970

3,525,658
GLASS-PLASTIC LAMINATES HAVING A LAYER OF GLASS FIBER FILLED POLYCARBONATE
Henry L. Setz, Bloomfield Hills, Mich., assignor to Ford Motor Company, Dearborn, Mich., a corporation of Delaware
Continuation-in-part of application Ser. No. 475,115, July 27, 1965. This application Nov. 21, 1968, Ser. No. 814,861
Int. Cl. B32b 17/04, 27/36
U.S. Cl. 161—1  7 Claims

ABSTRACT OF THE DISCLOSURE

A transparent structural panel is produced by laminating with heat and pressure a layer of solid, structurally strong, transparent plastic impregnated with glass fibers between two layers of glass. The layer of transparent plastic impregnated with glass fibers between two layers of glass. The layer of transparent plastic sandwiched between the layers of glass is exemplified by an organic polycarbonate and contains a thermal coefficient of expansion-modifying amount of glass fibers that renders such plastic compatible with the two layers of glass during and after the laminating operation. The glass fibers are further characterized in that they are chosen to have a refractive index not substantially differing from that of the plastic.

---

This application is a continuation-in-part of application Ser. No. 475,115 filed July 27, 1965, now abandoned.

This invention relates to improvements in transparent, structurally strong, glass-plastic laminates and to the method of their manufacture. The panels of this invention are shatter resistant and thermo-mechanically stable over wide ranges of temperature.

Laminates consisting of two relatively thick plates of glass and a relatively thin layer of organic adhesive are, of course, well known in the art. It is also known in the art to produce laminates wherein a rigid, plastic sheet, e.g. polymethyl methacrylate, with or without glass fiber impregnation, is protected from abrasion, weathering, etc., with very thin glass sheets having a thickness preferably in the range of about 0.001 to about 0.05 inch. Bonding is effected with a suitable adhesive. This type of laminate is described in detail by Lang et al. in U.S. Pat. 2,962,471.

In the laminates of the instant invention, relatively thick layers of glass and a relatively thick layer of a structurally strong, transparent, plastic solid are bonded together to form a completely transparent structural member that is thermo-mechanically stable over substantially increased ranges of temperature. Thermo-mechanical stability of the laminate is effected by incorporating glass fibers in the inner plastic structure in an amount sufficient to modify the thermal coefficient of expansion and/or contraction of the plastic layer so as to render such layer compatible with the layers of glass during and after cooling. Transparency is maintained by selecting glass fibers that have a refractive index not substantially differing from that of the plastic inner layer.

The coefficient of expansion of the polycarbonate plastic and glass are quite different. If a laminate is produced from an unmodified polycarbonate and glass, the stress crazing sensitivity of the polycarbonate upon cooling provides problems. The adhesion with the glass remains strong and cooling can cause the contracting plastic to actually tear patches of glass from the interface between the outer and inner layers. This is surprisingly alleviated by the use of the glass fibers.

This invention will be more fully understood by reference to the single figure of drawing which schematically depicts a cross section of a glass-plastic laminate.

This figure of drawing depicts two exterior layers of glass which have been numbered 1 and 3. Intermediate layers of glass 1 and 3 is a layer of a solid, structurally strong, transparent plastic. In the illustratetd embodiment, the plastic solid 2 is an organic polycarbonate prepared in accordance with Example 1 of U.S. Pat. 3,028,365 with 10 wt. percent thereof consisting of uniformly dispersed glass fibers having essentially the same refractive index as the polycarbonate sheet. The polycarbonates of di-(monohydroxyaryl)-alkanes disclosed by Schnell et al. in the aforementioned patent are particularly suitable for use in the laminates of this invention and its teachings are herein incorporated by reference.

The structurally strong glass laminate of this invention is noteworthy because of the relative thickness of both glass and rigid core plastic interlayer. The thickness of the glass is in excess of about 0.05 inch, advisedly in the range of about 0.06 to about 0.15 inch, and preferably in the range of about 0.08 to about 0.12 inch. In the embodiments designed for strong structural laminates, the transparent plastic inner layer has an average thickness in the range of about 0.06 to about 0.15 inch, advantageously 0.08 to about 0.12 inch.

In special embodiments, where the panel is designed to partially collapse under sudden force and to have superior energy absorbing properties, this technique can be used with plastic inner layers of lesser thickness, e.g. 0.02 to 0.06 inch average thickness.

The glass fiber content of the plastic inner layer will comprise between about 2 and about 40 weight percent of such layer, preferably between about 8 and about 15 weight percent thereof. Glass fibers are, of course, commercially available. In this application, it is advantageous to specify a selection of glass that has a refractive index as close as possible to that of the plastic innerlayer. The glass fibers used have an average length of about 0.05 to about 0.5 inch and are intimately and uniformly dispersed in the plastic interlayer while it is in a fluid state. The glass fiber impregnated polycarbonate can be extruded by conventional molding techniques into sheets that can be trimmed to fit the glass sheets of the desired laminate or, in a continuous process, can be extruded directly upon one glass layer with the second glass layer being superimposed over the plastic layer.

In a preferred embodiment, the laminate is formed by conventional heat and pressure techniques without the use of an extraneous adhesive. With polycarbonates of the type hereinbefore mentioned, a laminating temperature in the range of about 475° to about 575° F. is necessary to partially melt or adhesively soften the polycarbonate and to secure a satisfactory bond. Advantageously, the laminating temperature is in the range of about 500° to about 550° F. Laminating pressures need not be severe. Pressures of about 100 to about 300 p.s.i. or even less are ordinarily suitable. In the illustrated embodiment, a temperature of 525° F. and a pressure of 100 p.s.i. are used. The thickness of the glass layers 1 and 3 is 0.08 inch while the thickness of layer 2 is 0.100 inch.

It is also within the scope of the invention to also use an extraneous adhesive although in most instances this is unnecessary and undesirable. If a thin layer of such adhesive is used, a laminating temperature must be chosen that is compatible with both the glass fiber impregnated solid plastic and with the adhesive.

This invention is applicable to panels fabricated from ordinary glass laminating stock. However, superior results are obtained with the glass used in this product is highly prestressed. This prestressing may be accomplished either thermally as in conventional tempering process or chemically as in the Chemcor process. The use of pretested glass results in a much stronger product.

I claim as my invention:

1. An improved unitary structural member formed by heat and pressure lamination of outer layers of glass each having an average thickness in excess of about 0.05 inch and bonded directly together with an inner layer comprising a solid, structurally strong, transparent sheet of glass fiber impregnated, transparent organic polycarbonate, said glass fibers being uniformly dispersed in said transparent polymer, having a refractive index not substantially differing from that of the transparent organic polycarbonate and being present in an amount that modifies the thermal coefficient of expansion of said inner layer to render said inner layer thermo-mechanically compatible with said outer layers of glass in the resultant laminate.

2. An improved unitary structural member formed by heat and pressure lamination of outer layers of glass each having an average thickness in excess of about 0.05 inch and bonded directly together with an inner layer comprising a solid, transparent sheet of glass fiber impregnated, organic polycarbonate having an average thickness in excess of about 0.06 inch, said glass fibers being uniformly dispersed in said polycarbonate, having a refractive index not substantially differing from that of said polycarbonate, and being present in an amount that provides said inner layer with a thermal coefficient of expansion that renders said inner layer thermomechanically compatible with said outer layers of glass in the resultant laminate.

3. An improved unitary structural member formed by heat and pressure lamination of outer layers of glass each having an average thickness in excess of about 0.05 inch and bonded directly together with an inner layer consisting essentially of a solid, transparent sheet of glass fiber impregnated, organic polycarbonate having an average thickness in excess of about 0.06 inch, said glass fibers being uniformly dispersed in said polycarbonate, having a refractive index not substantially differing from that of said polycarbonate, and being present in an amount that constitutes between about 2 and about 40 weight percent of said inner layer, said amount providing said inner layer with a thermal coefficient of expansion that renders said inner layer thermo-mechanically compatible with said outer layers of glass in the resultant laminate.

4. An improved unitary structural member formed by heat and pressure lamination of outer layers of glass each having an average thickness in excess of about 0.05 inch and bonded directly together with an inner layer consisting essentially of a solid, transparent sheet of glass fiber impregnated, organic polycarbonate having an average thickness in excess of about 0.06 inch, said glass fibers being uniformly dispersed in said polycarbonate, having a refractive index not substantially differing from that of said polycarbonate, and being present in an amount that constitutes between about 8 and about 15 weight percent of said inner layer, said amount providing said inner layer with a thermal coefficient of expansion that renders said inner layer thermo-mechanically compatible with said outer layers of glass in theresultant laminate.

5. An improved unitary structural member formed by heat and pressure lamination of outer layers of glass each having an average thickness in excess of about 0.08 inch and bonded directly together with an inner layer consisting essentially of a solid, transparent sheet of glass fiber impregnated, organic polycarbonate having an average thickness in excess of about 0.08 inch, said glass fibers being uniformly dispersed in said polycarbonate, having a refractive index not substantially differing from that of said polycarbonate, and being present in an amount that constitutes between about 2 and about 40 weight percent of said inner layer, said amount being sufficient to provide said inner layer with a thermal coefficient of expansion that renders said inner layer thermo-mechanically compatible with said outer layers of glass in the resultant laminate.

6. An improved unitary structural member formed by heat and pressure lamination of outer layers of glass each having an average thickness in the range of about 0.08 to about 0.12 inch and bonded directly together with an inner layer consisting essentially of a solid, transparent sheet of glass fiber impregnated, organic polycarbonate having an average thickness in the range of about 0.08 to about 0.12 inch, said glass fibers being uniformly dispersed in said polycarbonate, having a refractive index not substantially differing from that of said polycarbonate, and being present in an amount that constitutes between about 8 and about 15 weight percent of said inner layer, said amount being sufficient to provide said inner layer with a thermal coefficient of expansion that renders said inner layer thermo-mechanically compatible with said outer layers of glass in the resultant laminate.

7. An energy absorbing structural member formed by heat and pressure lamination of outer layers of glass each having an average thickness in excess of about 0.05 inch and bonded directly together with an inner layer consisting essentially of a solid, transparent sheet of glass fiber impregnated, organic polycarbonate having an average thickness in the range of about 0.02 to about 0.06 inch, said glass fibers being uniformly dispersed in said polycarbonate, having a refractive index not substantially differing from that of said polycarbonate, and being present in an amount that constitutes between about 2 and about 40 weight percent of said inner layer, said amount providing said inner layer with a thermal coefficient of expansion that renders said inner layer thermo-mechanically compatible with said outer layers of glass in the resultant laminate.

References Cited

UNITED STATES PATENTS

| | | | |
|---|---|---|---|
| 2,311,613 | 2/1943 | Slayter | 161—93 |
| 2,374,040 | 4/1945 | Ryan | 156—106 |
| 2,400,139 | 5/1946 | Roland | 156—106 |
| 2,774,697 | 12/1956 | Koblitz | 161—183 |
| 2,946,711 | 7/1960 | Bragaw et al. | 156—106 |
| 2,962,471 | 11/1960 | Lang et al. | 156—106 |
| 3,028,365 | 4/1962 | Schnell et al. | 260—30.2 |
| 3,177,179 | 4/1965 | Lee et al. | 161—192 X |
| 3,287,201 | 11/1966 | Chisholm et al. | 161—1 |
| 3,388,032 | 6/1968 | Saunders | 161—183 |
| 3,388,034 | 6/1968 | McCombie | 161—183 |

JOHN T. GOOLKASIAN, Primary Examiner

R. A. KILLWORTH, Assistant Examiner

U.S. Cl. X.R.

156—106, 332; 161—125, 151, 165, 183, 192